(12) United States Patent
Ballinger et al.

(10) Patent No.: US 6,617,276 B1
(45) Date of Patent: Sep. 9, 2003

(54) HYDROCARBON TRAP/CATALYST FOR REDUCING COLD-START EMISSIONS FROM INTERNAL COMBUSTION ENGINES

(75) Inventors: Todd Howard Ballinger, Audubon, PA (US); Paul Joseph Andersen, Plymouth Meeting, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 09/621,596

(22) Filed: Jul. 21, 2000

(51) Int. Cl.$^7$ ............................. B01J 29/06; B01J 29/068
(52) U.S. Cl. ............................. 502/66; 502/64; 502/65; 502/73; 502/74
(58) Field of Search ............................. 502/64, 60, 65, 502/66, 73, 74, 339, 303, 304, 340, 344

(56) References Cited

U.S. PATENT DOCUMENTS

| | | | |
|---|---|---|---|
| 3,699,683 A | | 10/1972 | Tourtellotte et al. |
| 5,078,979 A | | 1/1992 | Dunne |
| 5,700,747 A | * | 12/1997 | Kyogoku et al. ............ 423/212 |
| 5,934,072 A | * | 8/1999 | Hirota et al. .................. 60/278 |
| 5,948,723 A | * | 9/1999 | Sung ........................... 502/302 |
| 6,047,544 A | * | 4/2000 | Yamamoto et al. ......... 422/171 |

FOREIGN PATENT DOCUMENTS

| | | | |
|---|---|---|---|
| EP | 0 749 774 | * | 12/1996 |
| EP | 0 782 880 | | 7/1997 |
| EP | 0 848 984 | | 6/1998 |
| EP | 0 867 218 | | 9/1998 |
| EP | 0 904 827 | * | 3/1999 |
| EP | 0 908 225 | | 4/1999 |
| WO | WO 97/22404 | | 6/1997 |
| WO | WO 99/33549 | * | 7/1999 |

OTHER PUBLICATIONS

Mark G. Stevens and Henry C. Foley (*Alkali Metals on Nanoporous Carbon: New Solid–Base Catalysts*, Chem. Commun., 519–520 (1997)).

Mark G. Stevens, Keith M. Sellers, Shekhar Subramoney and Henry C. Foley, *Catalytic Benzene Coupling on Caesium/Nanoporous Carbon Catalysts*, Chem. Commun., 2679–2680 (1998).

International Search Report dated May 22, 2002.

* cited by examiner

*Primary Examiner*—Tom Dunn
*Assistant Examiner*—Christina Ildebrando
(74) *Attorney, Agent, or Firm*—RatnerPrestia

(57) ABSTRACT

An active metal, particularly cesium, impregnated hydrocarbon adsorbent, such as zeolite, comprises an improved hydrocarbon trap/oxidizing catalyst for use in effectively adsorbing hydrocarbons during automotive cold-start and subsequently desorbing, oxidizing and removing hydrocarbons during warmer operating conditions. The active metal modified hydrocarbon adsorbent may be combined in other forms of multi-layer automotive exhaust gas catalytic structures.

23 Claims, No Drawings

HYDROCARBON TRAP/CATALYST FOR REDUCING COLD-START EMISSIONS FROM INTERNAL COMBUSTION ENGINES

TECHNICAL FIELD OF THE INVENTION

This invention relates to hydrocarbon trap/catalysts that are effective for trapping hydrocarbons and oxidizing the trapped hydrocarbons in an exhaust gas. The present invention is directed to enhancing oxidation of adsorbed hydrocarbons when the hydrocarbon trap/catalyst reaches a temperature at which the trapped (adsorbed) hydrocarbons are released.

BACKGROUND

Regulatory agencies have promulgated strict controls on the amounts of carbon monoxide, hydrocarbons and nitrogen oxides which automobiles can emit. The implementation of these controls has resulted in the use of catalytic converters to reduce the amount of pollutants emitted from automobiles.

To improve the emissions performance achievable by conversion catalyst compositions, particularly during cold-start operation, it has been proposed to use an adsorbent material to adsorb hydrocarbons during the cold-start period of engine operation. A number of patents disclose the broad concept of using an adsorbent material to minimize hydrocarbon emissions during cold-start engine operation. For example, U.S. Pat. No. 3,699,683 discloses an adsorbent bed placed after both a reducing catalyst and an oxidizing catalyst. That patent also discloses that when the exhaust gas stream is below 200° C., the gas stream is directed through the reducing catalyst then through the oxidizing catalyst and finally through the adsorbent bed, thereby adsorbing hydrocarbons on the adsorbent bed. When the temperature goes above 200° C. the gas stream which is discharged from the oxidation catalyst is divided into a major and minor portion. The major portion is discharged directly into the atmosphere. The minor portion is passed through the adsorbent bed, whereby unburned hydrocarbons are desorbed, and the resulting minor portion containing the desorbed unburned hydrocarbons is then passed into the engine where the desorbed unburned hydrocarbons are burned.

Another patent disclosing the use of both an adsorbent material and a catalyst composition to treat an automobile engine exhaust stream, especially during the cold-start period of engine operation, is U.S. Pat. No. 5,078,979. The adsorbent is a particular type of molecular sieve and the catalyst material which may be dispersed in the adsorbent may be a platinum group metal.

An international application published under the Patent Cooperation Treaty, International Publication Number WO 97/22404, discloses the use of an ion exchange reaction to alter the adsorption characteristics of a zeolite, thereby forming a basic zeolite said to be useful for adsorbing hydrocarbons from-exhaust streams. The ion exchange reaction takes place by mixing an alkaline metal or alkaline earth metal salt (sodium, calcium and magnesium are specifically disclosed) in an aqueous solution with the zeolite for a sufficient time and temperature to cause ion exchange. Typical reaction times range from 0.5 to 4.0 hours at from ambient up to 100° C. and more typically 50 to 75° C. The exchanged zeolite is then filtered and washed with water and dried. According to WO 97/22404, the basic zeolite can be formed into a slurry and then coated on to a carrier substrate.

In a publication by Mark G. Stevens and Henry C. Foley (*Alkali Metals on Nanoporous Carbon: New Solid-Base Catalysts*, Chem. Commun., 519–520 (1997)), it is disclosed that cesium may be entrapped in a carbogenic molecular sieve by vapor-phase deposition. In another publication by Stevens et al., (Mark G. Stevens, Keith M. Sellers, Shekhar Subramoney and Henry C. Foley, *Catalytic Benzene Coupling on Caesium/Nanoporous Carbon Catalysts*, Chem. Commun., 2679–2680 (1998)), such cesium entrapped carbogenic molecular sieves are said to have a high affinity for hydrogen, and for breaking of the C—H bond in benzene and thereby promoting benzene condensation to a biphenyl.

Notwithstanding the foregoing, there remains a need for an improved hydrocarbon trap/catalyst for automotive cold-start operation emissions.

SUMMARY OF THE INVENTION

The present invention pertains to a hydrocarbon trap/catalyst, i.e. a hydrocarbon adsorbing material in which hydrocarbons are adsorbed at a low exhaust gas temperature characteristic of an engine start-up condition. In accordance with the present invention, this material is impregnated with an active metal to enhance oxidation of the hydrocarbons as the hydrocarbons are desorbed from the material at an elevated temperature characteristic of normal engine exhaust conditions. The invention optionally further comprises one or more layers of a support material impregnated with one or more platinum group metal catalysts, in combination with the impregnated hydrocarbon trap catalyst of the present invention.

The present invention differs from prior hydrocarbon trap/catalysts materials by providing an active metal deposited on and in intimate contact with the hydrocarbon adsorbent material but with little or no chemical reaction between the active metal and the adsorbent. While enhancing oxidation of hydrocarbons, this active metal does not affect the adsorption characteristics of the material.

The composition of the present invention typically comprises (a), as the hydrocarbon adsorbent material, a zeolite which is effective for adsorbing hydrocarbons from an engine exhaust and (b) an active metal in intimate contact with the zeolite. The invention optionally further comprises one or more layers of (c) a three way or oxidation catalyst that includes at least one platinum group metal (PGM) and preferably includes a combination of platinum group metals. Most preferably that combination comprises platinum, palladium and rhodium in a weight ratio collectively of about 12:5:1.

The active metal useful for the above purposes is essentially any alkaline metal or alkaline earth metal, such as potassium, rubidium, cesium, beryllium, magnesium, calcium, barium and strontium. Cesium is preferred. Generally, the active metal is deposited in intimate contact with the hydrocarbon adsorbent (zeolite, for example) by pouring, dipping or spraying a soluble salt solution of the active metal onto the adsorbent, which is then heated to dryness.

Optionally, the hydrocarbon adsorbent may be first deposited (prior to impregnation with the active metal) on a catalyst substrate, such as an inert monolithic or foam structure or inert pellets or beads.

While zeolite is the preferred hydrocarbon adsorbent in the present invention, other hydrocarbon adsorbents may also be useful. Among such possibilities are amorphous silica and certain forms of carbon or activated carbon, particularly including refractory forms of carbon such as $C_n$ fullerenes.

DETAILED DESCRIPTION OF THE INVENTION

The present invention comprises an improved hydrocarbon trap composition including a hydrocarbon-adsorbing material, such as zeolite, which is impregnated with an active metal, such that oxidation of desorbed hydrocarbons is enhanced. Such impregnation may be effected by contacting a dry zeolite with a soluble salt solution, such as an acetate or a nitrate of an active metal, namely an alkaline metal or alkaline earth metal, particularly cesium, and drying the wet zeolite with heating to remove water, leaving the metal in intimate contact with the zeolite but avoiding ion exchange therewith. A similar effect may be produced by slurrying zeolite alone in water and depositing the slurry on a monolithic catalyst substrate, drying the slurry to leave the zeolite in intimate contact with the substrate and then dipping, pouring or spraying an active metal solution over the zeolite substrate and drying that solution, with heat, as above, to leave active metal in intimate contact with the zeolite on the substrate.

Both natural and synthetic zeolites as well as acidic, basic or neutral zeolites may be used as the hydrocarbon adsorbent. Natural zeolites include faujasites, clinoptilolites, mordenites, and chabazites. Synthetic zeolites include ZSM-5, beta, Y, ultrastable-Y, mordenite, ferrierite, and MCM-22, with ZSM-5 and beta preferred. The $SiO_2:Al_2O_3$ ratio for these materials is typically in the range of 2–1000, with a preferred $SiO_2:Al_2O_3$ ratio of 30–300.

In use, the active metal acts as a catalyst for breaking C—H bonds in the hydrocarbons. As indicated above, suitable active metals, which are believed to be useful for this purpose, are alkaline metals and alkaline earth metals, such as lithium, sodium, potassium, rubidium, cesium, beryllium, magnesium, calcium, barium and strontium. Of these, cesium is preferred.

Typically, the active metal-impregnated zeolite is a coating on a ceramic or metallic monolithic catalyst support or substrate which serves as an inert carrier for the active metal-containing zeolite and any subsequent catalyst coatings. Such support substrates may be porous or non-porous.

Following is a somewhat generalized but exemplary procedure for making an active metal impregnated zeolite in accordance with the present invention:

(a) Blending a zeolite and de-ionized water to form a slurry. 1 kilogram of zeolite is mixed with 2 liters of water.

(b) Adding to the slurry a binding material while the slurry is blending. The binder material is typically alumina or colloidal silicon dioxide. The binder is typically added in an amount of about 10–25% of the total weight of the zeolite to form a semi-solid mixture. The mixture is milled to obtain a nominal particle size of 1.0–20.0 microns, typically 4.5–5.0 microns. Once the desired particle size is achieved, the mixture is heated in flowing air at a temperature of in the range of 400° C.–600° C., typically about 500° C., for 30–90 minutes, typically 30–60 minutes, until it is essentially dry. Alternatively, the zeolite slurry, prepared as above, may be applied to a support substrate, such as a monolith catalyst base of the type used in automotive exhaust systems, by pouring or spraying the zeolite slurry onto the support substrate or by dipping the support substrate into the zeolite slurry to form a first layer coating. If applied to a support substrate, the zeolite and support substrate are heated, as described above, until the zeolite firmly adheres to the inert carrier and any excess water has been evaporated. The amount of zeolite and binding material deposited should be at least 0.2, and preferably more than 1.0, but possibly as much as 4.0 g/in$^3$ (g per 16.4 cm$^3$).

(c) Impregnating at least one active metal onto the surface of the zeolite. Typically impregnation is accomplished at room temperature followed by drying at an elevated temperature. A solution of the active metal (e.g. an aqueous solution of $CsNO_3$, $CsC_2H_3O_2$ or some other soluble form of the active metal; 0.64 M $CsNO_3$ in the example below) is poured over or sprayed on the zeolite. Alternatively, the zeolite or substrate on which zeolite has been deposited may be dipped into the solution. In any event, the zeolite is saturated with the active metal solution, by repeated contact steps if necessary, until enough of the solution has been absorbed in the zeolite to deposit a calculated amount of the active metal, taking into account the amount of solution absorbed and the concentration of the salt in the original solution. The amount of metal deposited should be at least 0.19, and preferably more than 3.7, but possibly as much as 16.2 weight % of active metal on the zeolite. The actual contact time to achieve this impregnation may be relatively short, on the order of 0.1 to 5 minutes, but generally is in the range of 0.5 to 2 minutes. One half minute of contact time is typically sufficient.

(d) Drying the active metal wet zeolite mixture. Typically the active metal solution/zeolite mixture is heated in flowing air at a temperature of about 400° C.–600° C., with 500° C. particularly preferred, for 30–90 minutes, with 30–60 minutes preferred. In this manner, the zeolite and active metal solution mixture is heated to dryness, whereupon some or all of the metal in the active metal salt (typically a nitrate or acetate) is decomposed into either its metallic state or to a metal compound which is in intimate contact with the zeolite. Because the original impregnation occurred at room temperature and the subsequent heating occurred with relatively little water present, relatively little chemical interaction occurs between the active metal and the zeolite adsorbent in this impregnation process.

In a typical embodiment of the present invention, the active metal-impregnated zeolite is formed on a monolithic catalyst substrate and forms a first coating of a multi-layer catalyst structure. The overall composition of one such catalyst structure is described below. In forming such a structure, the second and succeeding catalyst layers may be produced in accordance with the invention disclosed in U.S. Pat. No. 6,022,825—Andersen et al. (the '825 patent), of common assignment herewith, the entirety of which is incorporated herein by reference. For purposes of the present invention, the zirconium stabilized ceria of the second.layer, as disclosed in the '825 patent, may be replaced with zirconium stabilized manganate, containing 20–70% zirconium oxide, and typically containing 40–65% zirconium oxide.

An optional third catalyst layer useful in the present invention comprises a washcoat which is also derived from one or more component slurries. This third catalyst layer, which when in combination with the active metal-impregnated zeolite of the present invention, enhances oxidation of hydrocarbons may be produced in accordance with the invention disclosed in PCT application WO 99/67020, also of common assignment herewith and also incorporated herein by reference.

Preferably, the optional third layer, together with the optional second layer (i.e. all catalyst layers combined with a hydrocarbon adsorbent trap) comprises, as the PGM constituents, platinum, palladium and rhodium in a weight ratio on the order of 12:5:1.

EXAMPLES

In order to demonstrate the simulated cold start hydrocarbon trapping/oxidation characteristics of the present invention, the catalyst structure generally comprising the comparative composition set forth below in Hydrocarbon Trap/Catalyst 1 was tested against an exemplary catalyst structure/composition of the present invention, set forth below as Hydrocarbon Trap/Catalyst 2. Hydrocarbon Trap/Catalyst 2 contains cesium in the first layer 1; Comparative Hydrocarbon Trap/Catalyst 1 does not.

Hydrocarbon Trap/Catalyst 1 comprises a zeolite hydrocarbon adsorbent as Layer 1, on a monolith, subsequently coated with catalyst Layers 2 and 3.

Layer 1 was prepared by blending ZSM-5 and de-ionized water to form a slurry in a proportion of 1:2. Silicon dioxide was added to the slurry in an amount approximately equal to 10% by weight of the ZSM-5. The zeolite slurry was then coated on a conventional cordierite honeycomb monolith having 400 holes per square inch (per 6.45 square cm) by dipping the monolith into the slurry. The excess zeolite was blown off with compressed air, and the zeolite and monolith were subsequently heated in flowing air for 40 minutes at 500° C. to drive off excess water and adhere the zeolite to the surface of the monolith. The total loading was 1.65 g per $in^3$ (per 16.4 $cm^3$) with a composition by weight of 90.91% ZSM-5 and 9.09% silicon dioxide.

Layer 2 was prepared in accordance with the '825 patent. The total loading was 3.399 $g/in^3$ (per 16.4 $cm^3$) with a composition by weight of 67.67% La-stabilized alumina, 23.54% Zr-stabilized ceria, 2.71% NiO, 2.38% neodymium oxide, 2.62% Pt, and 1.09% Pd.

Layer 3 was prepared in accordance with WO 99/67020. The total loading was 1.358 $g/in^3$ (per 16.4 $cm^3$) with a composition by weight of 73.64% Ce-stabilized zirconia, 25.77% La-stabilized alumina, and 0.59% Rh.

Hydrocarbon Trap/Catalyst 2 is a layered catalyst structure similar to that of Hydrocarbon Trap Catalyst 1, but differing in that cesium is impregnated on the zeolite surface of Layer 1. Cesium was impregnated on the surface of the zeolite by pouring a 0.64 M solution of cesium nitrate ($CsNO_3$) onto the zeolite coated monolith at room temperature. The wet zeolite was then dried in heated flowing air for 40 minutes at 500° C. The total loading was 1.82 g per $in^3$ (per 16.4 $cm^3$) with a composition by weight of 82.42% ZSM-5, 9.35% cesium nitrate, and 8.24% silicon dioxide. Layers 2 and 3 were subsequently coated over layer 1 as described above.

Experimental Runs

The foregoing multi-layer catalyst structures Hydrocarbon Trap/Catalysts 1 and 2 were then tested. Prior to the actual test, each was exposed to a lean gas purge stream at a temperature of 500° C. for a period of 15 minutes. The lean gas purge stream comprised 2% oxygen, 10% water, and 88% nitrogen. Subsequently, the test catalyst structures were brought to 60° C. by a flow of nitrogen gas at that temperature. Thereafter each of these catalyst structures was exposed for 1 minute to a gas mixture, at 60° C., meant to simulate automotive cold-start exhaust gas. This gas mixture comprised 0.15% hydrocarbons, 1% carbon monoxide (omitted in Run 2), 2% oxygen, 10% water and 86.85% nitrogen. Immediately following exposure to the simulated cold-start exhaust gas, the catalyst structures were then heated from 60° C. to 500° C. at 50° C. per minute in a flowing gas stream of the same compositions as that used to simulate cold-start exhaust gas, but modified by the omission of hydrocarbons. Throughout these tests, the gas exiting the catalyst structures was continuously sampled and analyzed using both a flame ionization-detection system and infra-red detectors. The results of the tests are indicated in Table 1 below.

Each of these experimental runs were conducted twice, first with CO in the test gas and then without CO in the test gas, and these runs are identified in Table 1 below as Run 1 and Run 2 for each catalyst. In Table 1, "% Hydrocarbon Adsorbed" is based on the quantity of hydrocarbon in the test gas exiting the catalyst in the first minute of the test using the simulated cold-start exhaust gas versus the weight of hydrocarbon in that test gas as introduced to the catalyst during that time period. The term "% Hydrocarbon Oxidized" is based on the quantity of hydrocarbon adsorbed on the catalyst in the first minute of the test versus the quantity of the hydrocarbon oxidized in the 9 minute period during which the catalyst is exposed to the warmer simulated exhaust gas mixture; the latter is calculated from the quantity of unoxidized carbon exiting the catalyst in the second part of the test, as compared to that adsorbed in the catalyst in the first part of the test. Results shown in Table 1 demonstrate that the amount of hydrocarbons removed from the gas stream by the cesium-impregnated zeolite is on the order of twice that of the catalyst structure without the cesium, both with CO present and without.

TABLE 1

The % yield is calculated as
(% hydrocarbon adsorbed *% hydrocarbons oxidized)/100.

| Hydrocarbon Trap/ Catalyst | Test Condition | % Hydrocarbons Adsorbed | % Hydrocarbons Oxidized | % Yield |
|---|---|---|---|---|
| 1 | Run 1 (w/ CO) | 50.3 | 17.0 | 8.6 |
| 2 | Run 1 (w/ CO) | 46.5 | 29.8 | 13.9 |
| 1 | Run 2 (w/o CO) | 46.0 | 17.8 | 8.2 |
| 2 | Run 2 (w/o CO) | 51.8 | 36.9 | 19.1 |

While this invention has been disclosed with respect to specific embodiments thereof, it is not limited thereto. The subjoined claims are intended to be construed to encompass the present invention in its fill spirit and scope including such other variants and modifications as may be made by those skilled in the art without departing from that true spirit and scope thereof.

What is claimed:

1. A catalyst structure comprising:
   (a) a first layer consisting essentially of a hydrocarbon-adsorbing zeolite and an active metal selected from the group consisting of potassium, rubidium, and cesium, wherein said active metal is impregnated on said zeolite;
   (b) at least one additional layer consisting essentially of at least one platinum group metal; and
   (c) a catalyst substrate, on which said first layer and said at least one additional layer are disposed.

2. A catalyst structure, as recited in claim 1, wherein said active metal is cesium.

3. A catalyst structure, as recited in claim 1, wherein said platinum group metal is selected from at least one of platinum, palladium, rhodium, ruthenium and iridium.

4. A catalyst structure, as recited in claim 1, wherein said platinum group metal comprises platinum, palladium, and rhodium in a weight ratio of about 12:5:1.

5. A catalyst structure, as recited in claim 1, wherein said at least one additional layer further comprises:
   a high temperature catalyst on a support material, and/or;
   a low temperature catalyst on a support material.

6. A catalyst structure according to claim 1, wherein said at least one additional layer further comprises a high temperature catalyst comprising stabilized $CeO_2$, a low temperature catalyst comprising stabilized alumina, and wherein said platinum group metal is selected from at least one of platinum, palladium, rhodium, ruthenium and iridium.

7. A catalyst structure, according to claim 6, wherein said platinum group metal comprises platinum, palladium and rhodium in a weight ratio of about 12:5:1.

8. A catalyst according to claim 6, wherein
   said stabilized ceria is Zr-stabilized ceria; and
   said stabilized alumina is La-stabilized alumina.

9. A catalyst according to claim 8, wherein said at least one additional layer further comprises a metal oxide additive selected from the group consisting of BaO, CoO, $Fe_2O_3$, $MnO_2$, and NiO.

10. A catalyst according to claim 9 wherein said metal oxide additive is NiO.

11. A catalyst according to claim 6 further comprising a metal oxide additive.

12. A catalyst according to claim 1, wherein said at least one additional layer further comprises:
    a high temperature catalyst comprising zirconium stabilized manganate; and
    a low temperature catalyst comprising La-stabilized alumina.

13. A catalyst structure, as recited in claim 1, wherein said at least one additional layer comprises:
    (a) (i) cerium stabilized zirconia on a support material, and/or;
    (ii) lanthanum stabilized alumina on a support material.

14. A catalyst structure, as recited in claim 1, wherein said at least one additional layer comprises a second layer and a third layer, and said second layer overlies said first layer and comprises
    (a) (i) zirconium stabilized ceria on a support material, and/or;
    (ii) lanthanum stabilized alumina on a support material; and
    (b) said at least one platinum group metal selected from the group consisting of platinum, palladium, rhodium, ruthenium and iridium; and
    said third layer comprises:
    (c) (i) cerium stabilized zirconia on a support material, and/or;
    (ii) lanthanum stabilized alumina on a support material; and
    (d) said at least one platinum group metal.

15. A catalyst structure, as recited in claim 14, wherein said platinum group metal in said third layer is rhodium.

16. A catalyst structure, as recited in claim 15, wherein said second layer and said third layer collectively include platinum, palladium, and rhodium in a weight ratio of about 12:5:1.

17. A catalyst structure comprising:
    (a) a first layer consisting essentially of a hydrocarbon-adsorbing zeolite and an active metal selected from the group consisting of potassium, rubidium, and cesium, wherein said active metal is impregnated on said zeolite;
    (b) at least one additional layer consisting of at least one platinum group metal and an additional component selected from the group consisting of at least one of a high temperature catalyst, a low temperature catalyst, and a metal oxide additive; and
    (c) a catalyst substrate, on which said first layer and said at least one additional layer are disposed.

18. A catalyst structure comprising:
    (a) a first layer consisting essentially of a hydrocarbon-adsorbing zeolite and an active metal selected from the group consisting of potassium, rubidium, and cesium, wherein said active metal is impregnated on said zeolite;
    (b) a second layer overlying said first layer and consisting of at least one platinum group metal selected from the group consisting of platinum, palladium, rhodium, ruthenium and iridium, zirconium stabilized ceria, lanthanum stabilized alumina, and at least one metal oxide additive;
    (c) a third layer consisting of at least one platinum group metal selected from the group consisting of platinum, palladium, rhodium, ruthenium and iridium, ceria stabilized zirconia, and lanthanum stabilized alumina;
    (d) a catalyst substrate, on which said first layer, said second layer, and said third layer are disposed.

19. A catalyst structure, as recited in claim 18, wherein said at least one platinum group metal in said second layer is platinum and palladium and said platinum group metal in said third layer is rhodium.

20. A method of making a catalyst comprising the steps of:
    (a) preparing a slurry containing a hydrocarbon-adsorbing zeolite;
    (b) applying said slurry to a catalyst support substrate to form a first layer thereon;
    (c) impregnating said first layer with a solution of a soluble salt of an active metal selected from the group consisting of potassium, rubidium, and cesium;
    (d) heating said first layer to dryness; and
    (e) applying to said first layer a second layer consisting essentially of at least one platinum group metal.

21. A method of making a catalyst as in claim 20, wherein said active metal is cesium.

22. A method of making a catalyst as in claim 20, wherein said salt is selected from the group consisting of nitrates and acetates.

23. A method of making a catalyst comprising the steps of:
    (a) preparing a slurry containing a hydrocarbon-adsorbing zeolite;
    (b) applying said slurry to a catalyst support substrate to form a first layer thereon;
    (c) impregnating said first layer with a solution of a soluble salt of an active metal selected from the group consisting of potassium, rubidium, and cesium;
    (d) heating said first layer to dryness; and
    (e) applying to said first layer a second layer consisting of at least one platinum group metal and an additional component selected from the group consisting of at least one of a high temperature catalyst, a low temperature catalyst, and a metal oxide additive.

* * * * *